United States Patent
Koeppel et al.

(10) Patent No.: US 11,522,476 B2
(45) Date of Patent: Dec. 6, 2022

(54) CONTROL METHOD AND CONTROL UNIT FOR A DC PUMP MOTOR

(71) Applicant: BAIER & KOEPPEL GMBH & CO. KG, Pegnitz (DE)

(72) Inventors: Bernhard Koeppel, Pegnitz (DE); Andreas Redel, Auerbach (DE)

(73) Assignee: BAIER & KOEPPEL GMBH & CO. KG, Pegnitz (DE)

( * ) Notice: Subject to any disclaimer, the term of this patent is extended or adjusted under 35 U.S.C. 154(b) by 351 days.

(21) Appl. No.: 16/791,181

(22) Filed: Feb. 14, 2020

(65) Prior Publication Data
US 2020/0266738 A1 Aug. 20, 2020

(30) Foreign Application Priority Data
Feb. 18, 2019 (EP) .................................... 19157725

(51) Int. Cl.
*H02P 7/29* (2016.01)
*F04B 49/06* (2006.01)

(52) U.S. Cl.
CPC ................ *H02P 7/29* (2013.01); *F04B 49/06* (2013.01); *F04B 2203/0201* (2013.01); *F04B 2203/0202* (2013.01); *F04B 2203/0209* (2013.01); *F05B 2270/802* (2013.01)

(58) Field of Classification Search
CPC .... H02P 7/29; F04B 49/06; F04B 2203/0201; F04B 2203/0202; F04B 2203/0209; F05B 2270/802
See application file for complete search history.

(56) References Cited

U.S. PATENT DOCUMENTS 6,676,383 B2 * 1/2004 Schob .................... G01N 11/14
138/26
7,326,282 B2 * 2/2008 Cattani .................. A61C 17/12
96/204
(Continued)

FOREIGN PATENT DOCUMENTS

DE           44 44 810 A1    6/1996
DE             4444810 A1 *  6/1996    ......... B60H 1/00828
(Continued)

OTHER PUBLICATIONS

European Patent Office, Office Action, Application No. 19157725.3, dated Jan. 14, 2022, 6 pages [No English Language Translation Available].

(Continued)

*Primary Examiner* — Muhammad S Islam
*Assistant Examiner* — Devon A Joseph
(74) *Attorney, Agent, or Firm* — Quarles & Brady LLP

(57) ABSTRACT

A method for controlling a DC pump motor, preferably a brushed DC motor for pumping lubricant, which motor is controlled by a pulse-width modulated (PWM) control signal, wherein current parameters are acquired in an acquisition step and a duty cycle (D) of the PWM control signal ($S_{PWM}$) is adapted and/or changed on the basis of the detected parameters in an adaptation step, wherein the acquisition of current parameters comprises at least the acquisition of a current input voltage ($U_B$).

19 Claims, 3 Drawing Sheets

(56) References Cited

U.S. PATENT DOCUMENTS

Figure 1:
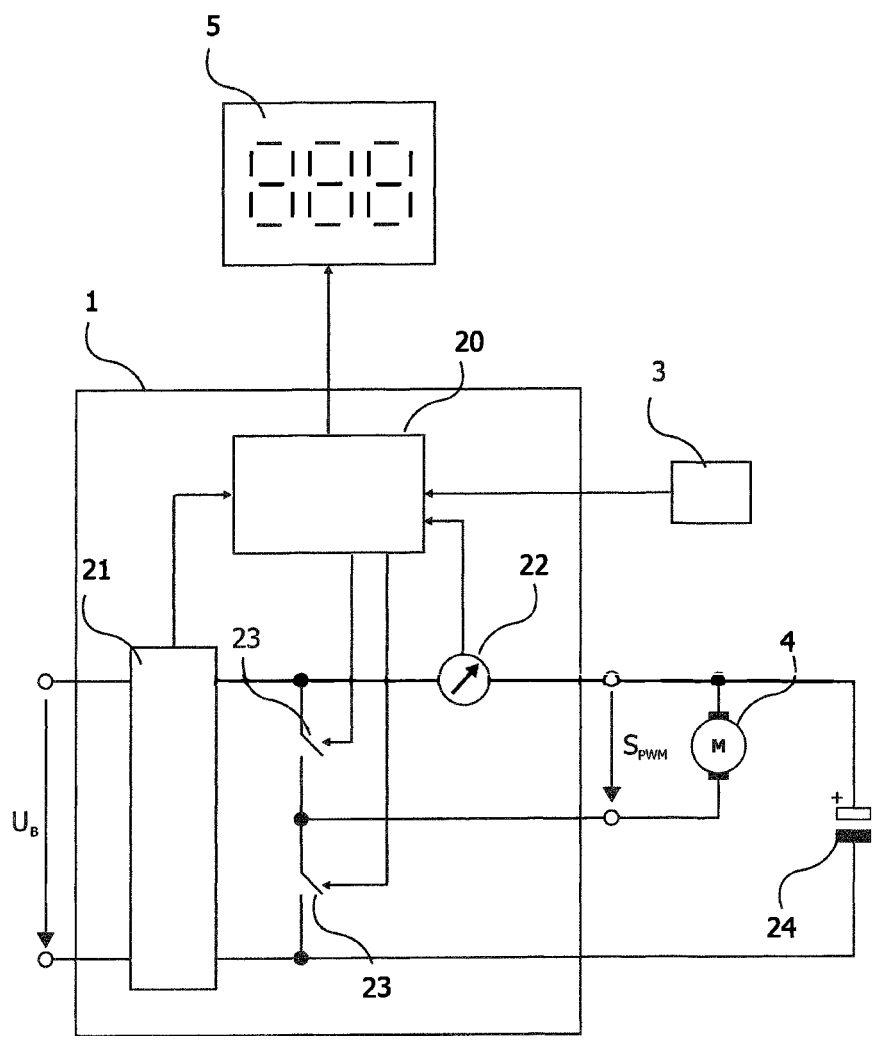

| | | | | |
|---|---|---|---|---|
| 2003/0103852 | A1* | 6/2003 | Schob | B24B 57/02 417/410.1 |
| 2004/0055363 | A1* | 3/2004 | Bristol | F04B 49/20 700/282 |
| 2005/0109212 | A1* | 5/2005 | Cattani | A61C 17/12 96/397 |
| 2008/0041081 | A1* | 2/2008 | Tolbert | F25B 49/025 62/228.4 |
| 2008/0131286 | A1* | 6/2008 | Koehl | G05D 16/202 417/12 |
| 2008/0303477 | A1* | 12/2008 | Patel | H02P 29/032 318/802 |
| 2011/0282551 | A1* | 11/2011 | Sasaki | B62D 5/065 701/42 |
| 2014/0326430 | A1* | 11/2014 | Carpenter | B60H 1/00278 165/41 |
| 2016/0319811 | A1* | 11/2016 | Daniski | F04B 49/20 |
| 2017/0366123 | A1* | 12/2017 | Saw | H02P 8/14 |

FOREIGN PATENT DOCUMENTS

| | | | |
|---|---|---|---|
| DE | 20019186 U1 | 1/2001 | |
| DE | 100 22 924 A1 | 11/2001 | |
| EP | 1 284 369 A1 | 2/2003 | |
| JP | 2001173586 A * | 6/2001 | |
| JP | 2002221327 A * | 8/2002 | |
| JP | 2010236191 A * | 10/2010 | |
| JP | 2021051527 A * | 4/2021 | B60H 1/00828 |
| WO | WO-9618848 A1 * | 6/1996 | B60H 1/00828 |

OTHER PUBLICATIONS

Search Report dated Oct. 24, 2019 in connection with EP Application 19157725.3.

* cited by examiner

CONTROL METHOD AND CONTROL UNIT FOR A DC PUMP MOTOR

CROSS-REFERENCE TO RELATED APPLICATIONS

This application claims priority to European Patent Application No. 19157725.3. filed Feb. 18, 2019. The contents of this application are hereby incorporated by reference as if set forth in its entirety herein.

DESCRIPTION

The disclosure relates to a control method and a control unit for controlling a DC pump motor, preferably a brushed DC motor for pumping lubricant, as well as a pump system, in particular for pumping lubricants, and a method for calibrating the control unit.

In the prior art, DC pump motors are used to pump lubricant from a lubricant reservoir to a desired lubrication point or to several desired lubrication points where lubricant is required. Lubricant pumps are used in various areas, for example to lubricate various lubrication points in trucks, in construction or agricultural machinery in technical installations or equipment in mining and wind power plants. In the different application areas, there are typically different operating conditions for the DC pump motor as well as for the control unit, so that there is a large selection of different pump motors and control units, each of which is or must be individually adapted to the different operating conditions.

Conventionally, a precise selection must therefore be made before commissioning to determine which components of the system can be combined without the components being damaged or even destroyed. For example, it is typically necessary to decide which electric pump motors can be operated with which control unit and with which firmware implemented on it. In particular, cost-effective DC pump motors have no rotational speed sensors or, optionally, only inexpensive, rather inaccurate or unreliable rotational speed sensors.

In addition, the conditions for the DC pump motor and thus also for the control unit can change during operation, since the viscosity of the lubricant to be pumped can change due to different outside temperatures, for example. This changes the resistance against which the lubricant pump has to work. For the DC pump motor, the torque that it must apply for a pump stroke changes if its speed and thus the number of pump strokes per time of the lubricant pump are to be maintained. In addition, a changing number of pump strokes per time leads to an unsteady running behavior of the pump and, in addition, it cannot be guaranteed that the required quantity of lubricant actually reaches the lubrication points.

It is therefore the object of the disclosure to provide a universally applicable control unit that is capable of controlling a DC pump motor that is as cost-effective as possible even under different operating conditions, in particular with different operating voltages as input voltage.

The object is solved, for example, by a method according to claim 1, a control unit according to claim 11, a pump system according to claim 18, and a method for calibration according to claim 19.

According to a first aspect of the disclosure, the object is solved in particular by a method for controlling a DC pump motor, preferably a brushed DC motor for pumping lubricant, which is controlled by a pulse-width modulated (PWM) control signal, wherein current parameters are acquired in a single acquisition step, and a duty cycle of the PWM control signal is adapted and/or changed with the aid of the acquired parameters in an adaptation step, wherein the acquisition of current parameters comprises at least the acquisition of a current input voltage.

An essential core of the disclosure lies in the fact that current parameters, i.e. in particular the operating voltage, are automatically recorded in one acquisition step. By acquiring the current parameters and adapting the control of the DC pump motor, it is possible to provide a universally applicable DC pump motor together with the control unit according to disclosure for different areas of application, wherein these can be operated under different operating conditions. The current parameters acquired in the acquisition step are then used in the adaptation step as a basis for adapting and/or changing the duty cycle of the PWM control signal. The PWM control signal is used to control the DC pump motor with a voltage suitable for the DC pump motor. By adjusting the duty cycle of the PWM control signal, a DC pump motor can be operated even with different input voltages, since by reducing the overall duty cycle, i.e. after integration due to the low-pass effect of the motor coils, a lower effective voltage is applied to the DC pump motor and, consequently, a higher effective voltage is applied to the DC pump motor when the duty cycle is increased.

The duty cycle is understood here as a ratio between the pulse width $t_e$ and the period duration T of a PWM signal which, for example, has periodically recurring square-wave pulses. The pulse width $t_e$ describes (metaphorically speaking) the width of the square pulse, i.e. the time period during which the square pulse is switched to a high voltage value. Further pulse forms are also possible. In this context, a high voltage value is understood to mean a voltage value that can have a value from 8V to 36V or preferably from 10V to 24V. During the remaining duration of the period T the PWM signal is at a low voltage value, wherein a low voltage value is preferably understood as a voltage of 0V.

In particular, the acquisition of current parameters also includes the acquisition of a motor current of the DC pump motor and/or an outside temperature, whereby the control method can also be used under varying operating conditions, such as fluctuating outside temperatures and/or also for DC pump motors with different characteristics.

The acquisition of the motor current makes it possible to detect recurring motor current patterns. The recurring motor current patterns are characteristic of a pump stroke, which makes it possible to deduce from the motor current whether and when a pump stroke has occurred.

In particular, in the adaptation step, the duty cycle of the PWM control signals is adapted independently of the input voltage if the input voltage in the acquisition step falls below a lower threshold value. Preferably, the lower threshold value can be a value from 8V to 15V or especially from 9V to 12V, preferably exactly 12V. A duty cycle equal to one means that the PWM signal is switched to the high voltage value over the entire period T. This means that the PWM signal is switched to the high voltage value over the entire period T. This means that comparatively low operating voltages can be used directly as input voltages or connected through to the DC pump motor.

Preferably, the duty cycle of the PWM control signal is adapted in the adaptation step, preferably in every operating situation, in such a way that an essentially identical rotational speed of the DC pump motor, which is specified as constant, is achieved. This means that no rotational speed sensor is required, further reducing costs.

The duty cycle of the PWM control signal is preferably adapted in the adaptation step—preferably in every operating situation—in such a way that an at least essentially constant rotational speed of the DC motor is achieved, preferably without recourse to measured values of a rotational speed sensor.

The rotational speed of the DC motor can also be determined from the evaluation of the motor current ($I_m$) in a further optional embodiment. In both alternatives, i.e. without the need to acquire a current rotational speed of the motor at all and without calculating the speed using the acquired motor current (virtual rotational speed sensor), an additional rotational speed sensor can therefore be dispensed with. This means that comparatively inexpensive DC motors without rotational speed sensors can also be controlled in such a way that they are regulated to a constant rotational speed.

It obviously is also possible to provide a separate physical rotational speed sensor. Altogether, the disclosure provides for three alternatives in this respect, namely the complete renunciation of acquiring the speed while simultaneously adjusting the duty cycle (D) of the PWM control signal to maintain a given speed, the provision of a virtual rotational speed sensor by acquiring certain current patterns in the motor current ($I_m$) or the provision of a physical rotational speed sensor.

A stable and quiet operation of the DC motor is achieved by a constant rotational speed of the electric motor. At the same time, a reliable lubricant supply is guaranteed. By maintaining a specified speed, the volume of lubricant applied can also be precisely determined at any time.

Preferably, the acquisition step can occur in an event-driven manner at irregular intervals and/or cyclic intervals. The control method can be triggered in particular by an external trigger pulse, for example, by an event-controlled acquisition step taking place at irregular intervals, so that an adaptive reaction can be made to certain events. As a result of an acquisition step occurring at cyclic intervals, on the other hand, a permanent acquisition of the data determined in the acquisition step can be ensured.

In particular, in the adaptation step, the duty cycle is set to a value from zero to one in accordance with a predetermined formula as a function of the acquired input voltage and of the optionally acquired outside temperature, and of the optionally acquired motor current of the DC pump motor, wherein the values zero and one are included in particular. This allows the duty cycle to be set in such a way that the motor speed remains constant even under changing conditions and the torque required for this can be applied.

In particular, a predetermined formula can also be understood as an algorithm and/or a control algorithm which sets the duty cycle accordingly and/or regulates the duty cycle to a specific setpoint value on the basis of the acquired input voltage and the optionally acquired outside temperature and the optionally acquired motor current. In particular, various steps within a control loop can be repeated cyclically and/or or be carried out in an event-controlled manner.

In a further optionally possible, but by no means mandatory embodiment, in the acquisition step a rotational speed of the DC pump motor is detected by a rotational speed sensor, and in the adaptation step the duty cycle of the PWM control signals is adapted in such a way that an at least substantially constant rotational speed of the DC pump motor is achieved. A stable and quiet operation of the DC pump motor is achieved by a constant rotational speed of the electric motor.

In particular, if the above method is used in a pump element for pumping lubricant from a lubricant reservoir, a pumping quantity of the pump element is determined by a pump stroke and the substantially constant rotational speed of the DC pump motor. In particular, the number of pump strokes can be summed up over the period of time the pump is operated at a given constant rotational speed, so that a total quantity (the pumping quantity) of the pumped lubricant can be calculated.

Preferably, a filling level of the lubricant reservoir is determined by the pumping quantity of the pump element, which in turn makes it possible to calculate how much lubricant has been pumped out of the lubricant reservoir. A level sensor, which would otherwise be present in the lubricant reservoir, can thus be saved.

In a concrete embodiment, the input voltage in particular can be in a range from 5V to 37V or preferably in a range between 11V and 25V. In this concrete embodiment, for example, a period duration T of the PWM signal can be 10 ms or less (equivalent to a frequency of 100 Hz or more). For example, the period duration can also be in a range between 10 ms and 10 μs or preferably 33.3 μs (equivalent to a frequency of 30 kHz). In particular, the acquisition step can be performed periodically with a period $T_{erf}$ in the range between 10 ms and 200 ms, preferably with a period duration $T_{erf}$ of 100 ms.

The above-mentioned object is further solved by a control unit for controlling a DC pump motor, preferably a brushed DC motor, wherein the control unit is controlled in particular by the method according to the above type, and comprises the following:
- a DC pump motor, in particular designed as a brushed DC motor;
- one or more switching elements; and
- a control module designed to switch the switching element(s) to a conductive or non-conductive state;

wherein the control unit further comprises parameter acquisition units adapted to acquire current parameters and wherein the switching element or elements are switched by the control module such that the DC pump motor is controlled by a pulse-width modulated (PWM) control signal, wherein a duty cycle of the PWM control signal is adapted and/or changed on the basis of the acquired current parameters.

In particular, the parameter acquisition units shall have at least one input voltage sensor for acquiring an input voltage and preferably one or more of the following sensors:
- a motor current sensor for acquiring a motor current of the DC pump motor; and preferably
- an outside temperature sensor to acquire an outside temperature, wherein the current parameters comprise an input voltage and the motor current of the DC pump motor, and preferably an outside temperature.

Preferably, the control unit also does not have a rotational speed sensor, wherein the rotational speed of the DC pump motor is either specified by the control technology and precisely maintained by changing the duty cycle of the PWM control signal or additionally checked by acquiring the motor current or readjusted to a fixed value. This means that no rotational speed sensor is required, further reducing costs. In particular, the PWM control signal is adapted so as to achieve an at least substantially constant rotational speed of the DC pump motor, if no rotational speed acquisition is performed at all or even if the rotational speed is acquired by evaluating the motor current (virtual rotational speed sensor) or even if the values of a physical rotational speed sensor are detected. A stable and quiet operation of the DC pump motor is achieved by a constant rotational speed of the electric motor. At the same time, a reliable supply of lubricant to the lubrication points is guaranteed and the quantity of lubricant applied can be calculated on the basis of the rotational speed, i.e. the pump strokes carried out.

In a further embodiment which is by no means mandatory, the control unit also has, as already mentioned, a rotational speed sensor which detects the rotational speed of the DC pump motor, wherein the PWM control signals are adapted in such a way that an at least substantially constant rotational speed of the DC pump motor is achieved. This ensures stable and quiet operation of the electric motor. The rotational speed of the DC pump motor can be determined e.g. by Hall sensors.

In particular, when the control unit is integrated in a pump element for pumping lubricant from a lubricant reservoir, the control unit is adapted to determine a pumping quantity of the pump element from a pump stroke and the substantially constant rotational speed of the DC pump motor. As already mentioned, the pump stroke of the pump can be used to determine the pumping quantity of the pump element.

Preferably, the filling level of the lubricant reservoir is determined by the pumping quantity of the pump element. This in turn makes it possible to calculate how much lubricant has been pumped out of the lubricant reservoir so that a level sensor, which would otherwise be present in the lubricant reservoir, can be saved.

The above object is further solved by a pump system, in particular for pumping lubricants, comprising the following:
a pump element driven by a DC pump motor;
a DC pump motor, preferably designed as a brushed DC motor;
a lubricant reservoir to which the pump is connected;
a control unit, in particular of the above type, for controlling the pump motor by the control method of the above type; and preferably
a display to indicate a level of the lubricant reservoir determined by the control unit.

In particular, the above object is further solved by a method for calibrating a control unit in the above manner, preferably in an above pump system, wherein initial parameters, such as a stored formula for determining the duty cycle of the PWM control signal, and preferably a pump stroke value, are provided by the manufacturer, and wherein the initial parameters are calibrated by means of test measurements in a plurality of calibration steps under specific conditions.

Preferably, the method for calibration includes the following calibration steps:
Applying certain calibration voltages to the control unit;
Controlling the DC pump motor with the control unit;
Performing test measurements by determining an actual speed under a predetermined load;
Comparing the actual rotational speed with a target rotational speed to be reached under the predetermined load; and
Adjusting the initial parameters so that the actual speed and the target speed match.

A predetermined load can be understood as the pumping of a medium with a certain behavior (a certain viscosity). The calibration voltage can, for example, be in the range from 10V to 20V, or especially between 10V and 18V, or preferably 12V.

Further embodiments result from the subclaims.

Figure 2A:
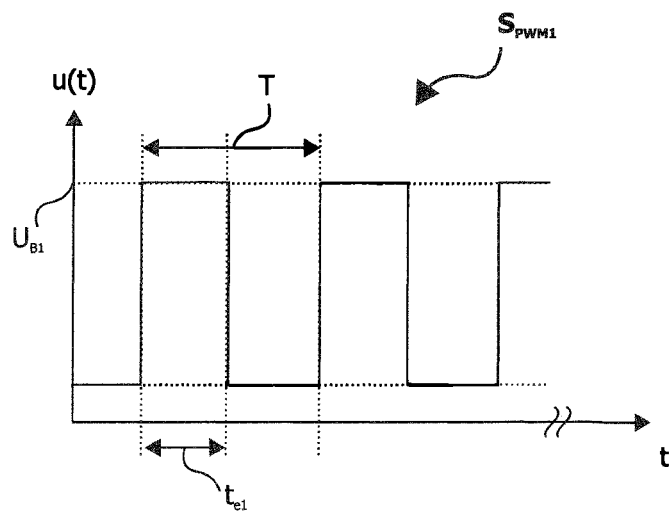
Figure 2B:
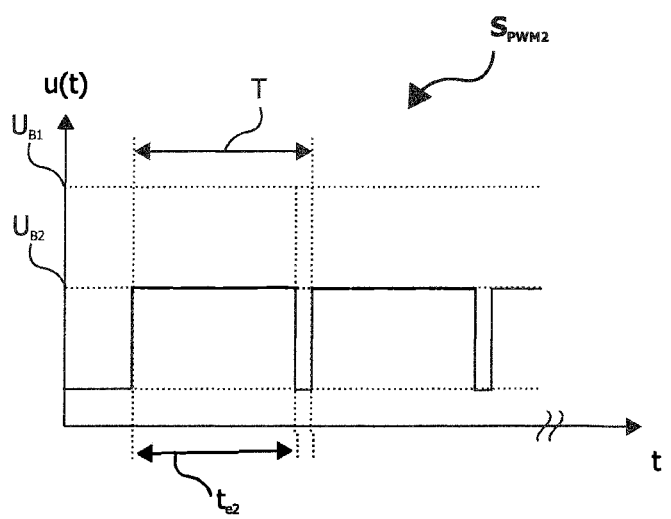
Figure 3:
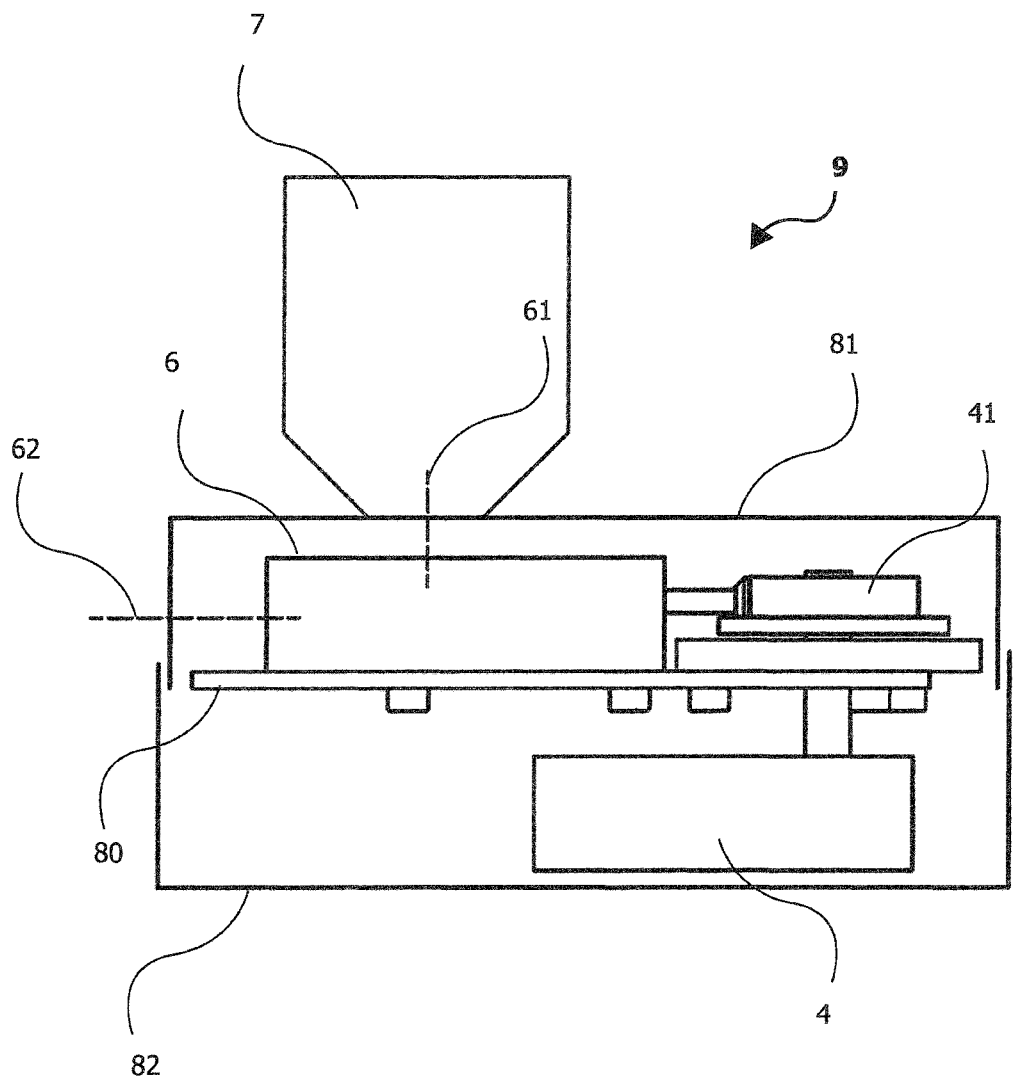
Figure 4:
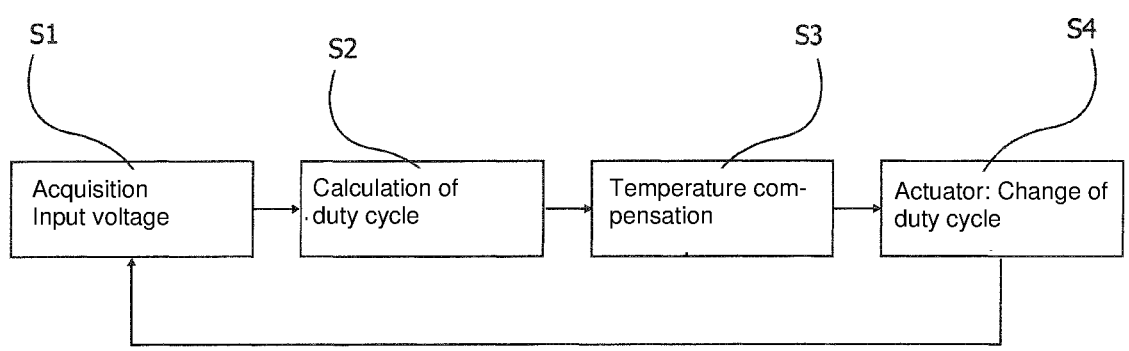

In the following, the disclosure is described by reference to embodiment examples, which are explained in more detail using the figures, wherein:
FIG. 1 shows a circuit diagram of a first embodiment of the control unit according to the disclosure;
FIG. 2A shows a signal characteristic of an embodiment of the control unit according to the disclosure;
FIG. 2B a signal characteristic of a further embodiment of the control unit according to the disclosure;
FIG. 3 shows a cross-sectional view of a pump system according to the disclosure, and
FIG. 4 shows a sequence diagram of the steps of an embodiment of the method according to the disclosure for controlling a DC pump motor.

FIG. 1 shows a circuit diagram of a first embodiment of the control unit 1 according to the disclosure. The control unit has a control module 20 which controls the DC pump motor 4 with a PWM control signal $S_{PWM}$. In this embodiment example, control unit 1 has two switching elements 23 which are connected in series and controlled by control module 20. The switching elements 23 essentially function as switches and can be designed as bipolar transistors or metal oxide semiconductor field effect transistors (MOSFET), for example, or optionally as insulated gate bipolar transistors (IGBT). The DC pump motor 4 is supplied with a voltage u(t) which is applied above the upper switching element 23, i.e. applied to the PWM control signal $S_{PWM}$. In addition, the motor current $I_m$ is measured with the motor current sensor 22. The measured motor current $I_m$ is passed on to the control module 20. Furthermore, in FIG. 1, a smoothing capacitor 24 is electrically connected to a connection of the DC pump motor 4 (the positive connection) and ground to smooth the PWM control signal $S_{PWM}$.

In addition, the circuit diagram illustrated in FIG. 1 shows an input voltage sensor 21, to which an input voltage $U_B$, which can also be referred to as operating voltage, is applied. The input voltage sensor 21 measures the applied input voltage $U_B$ and transmits the measured value of the input voltage $U_B$ to the control module 20. The input voltage $U_B$ is passed directly (unchanged) to the series connection of the switching elements 23. The illustrated embodiment example is implemented as a 2-quadrant actuator, but it is also possible to realize control unit 1 as a 1-quadrant actuator (with only one switching element 23 and one diode instead of the upper switching element 23) or as a 4-quadrant actuator (with a total of four switching elements 23, which together with the DC pump motor form an H-bridge circuit) according to the disclosure.

It is also possible that the control unit, consisting of the control module 20, the input voltage sensor 21, the motor current sensor 22, the switching elements 23, the smoothing capacitor 24 and/or the outside temperature sensor 3, is realized in particular on a circuit board.

In addition, an outside temperature sensor 3 is shown in FIG. 1. The outside temperature sensor 3 supplies a temperature value $T_A$, which is transmitted directly to the control module 20. Depending on the embodiment example, the outside temperature sensor 3 can be mounted on a housing of the control unit or integrated in the housing. It would also be possible that the outside temperature sensor 3 is arranged in a lubricant reservoir (not shown in FIG. 1) if this is present in the pump system in which the control unit 1 is integrated.

The control unit 1 can preferably have a memory (not shown) to which initial parameters, such as the stored formula for determining the duty cycle of the PWM control signal, and preferably a pump stroke value or different routines for certain operating modes, can be stored.

In addition, FIG. 1 shows a display 5, which makes it possible to display information that is important for the operation of the electric pump. For example, information available to control module 20 may be displayed on display 5. This information can include the current parameters, such as the input voltage, the motor current $I_m$, or the outside temperature $T_A$, or it can conversely include additional information, such as the speed of the DC pump motor, the pumping quantity, the pump stroke, or the level of the lubricant reservoir. It would also be conceivable that display 5 could also display several pieces of information at the same time in order to provide as much clarity as possible. Furthermore, it would also be conceivable that an input unit (not illustrated) could communicate with control unit 1 (e.g. via cable or wireless), so that initial parameters, such as the stored formula for determining the duty cycle of the PWM control signal, and preferably a pump stroke value, or different routines for certain operating modes, can optionally be uploaded to the control unit.

FIG. 2A shows a signal curve of a PWM control signal $S_{PWM}$. FIG. 2A shows the time-varying voltage signal u(t) over time t.

In this embodiment example, an input voltage $U_{B1}$ is shown which is used in the predetermined formula for adapting the duty cycle D of the PWM control signal $S_{PWM1}$. The duty cycle D is defined as the ratio of the pulse width $t_{e1}$ to the period duration T of the PWM control signal $S_{PWM1}$. In FIG. 2A the duty cycle D is 0.5 (i.e. 50%).

FIG. 2B shows a further signal curve of the PWM control signal $S_{PWM2}$. This embodiment example shows another input voltage $U_{B2}$ which is smaller than the input voltage $U_{B1}$ from FIG. 2A. The input voltage $U_{B2}$ is below a lower threshold value $U_{Schw}$ (not shown), whereby the duty cycle D is adjusted and/or changed independently of the input voltage $U_{B2}$ according to the predetermined formula for adjusting the duty cycle D. FIG. 2B shows that the pulse width $t_{e2}$ tends to be wider than the pulse width $t_{e1}$ determined from the predetermined formula and the first higher input voltage UB1. The period duration T of duty cycle D, on the other hand, remains unchanged. The duty cycle D shown in FIG. 2B is approximately 0.9 (i.e. 90%).

FIG. 3 shows a cross-sectional view of a typical lubricant pump, as used in connection with the present disclosure, with DC pump motor 4 and integrated control unit 1 for pumping lubricant.

The lubricant reservoir (7) contains a predetermined amount of lubricant, lubricating agent or grease. The pump element 6 is in fluid connection with the lubricant reservoir 7 in a suction area 61, so that lubricant, lubricating agent or grease can be sucked out of the lubricant reservoir. In addition, pressure output 62 of pump element 6 is shown schematically on the side of pump element 6.

Furthermore, FIG. 3 shows an eccentric unit 41 which is driven by the DC pump motor 4. The eccentric unit 41 converts the (rotary) rotational motion of the DC pump motor 4 into a (translatory) pumping motion and transmits the pumping motion to the pump element 6. The pump element 6, the eccentric unit 41 and the DC pump motor 4 are mounted on a base plate 80 and housed in a housing 81 with a cover 82.

FIG. 4 shows a sequence diagram of an embodiment example of the method for controlling a DC pump motor as a control path. The control path comprises steps S1, S2, S3 and S4, wherein steps S1 to S4 are repeated cyclically in this embodiment example.

In a concrete embodiment example, steps S1 to S4 can be repeated cyclically, especially every 50 ms to 200 ms. Preferably steps S1 to S4 are repeated every 100 ms.

In FIG. 4, the input voltage of the control unit according to the disclosure is acquired in step S1. This is followed by step S2, in which the duty cycle D is calculated in particular on the basis of a stored formula and/or determined calibration values from production. In the following step S3, a temperature compensation is carried out on the basis of the optionally acquired temperature. In step S4, the duty cycle D is now changed and output to the control module (20) in particular.

REFERENCE CHARACTER LIST

1 Control unit;
20 Control module;
21 Input voltage sensor;
22 Motor current sensor;
23 Switching elements;
24 Smoothing capacitor;
3 Outside temperature sensor;
4 DC pump motor (brushed DC motor);
41 Eccentric unit;
5 Display;
6 Pump element;
61 Suction area;
62 Pressure output;
7 Lubricant reservoir;
80 Base plate;
81 Housing;
82 Cover;
D Duty cycle;
$I_m$ Motor current;
S1, S2, Process steps of the control path;
S3, S4
$S_{PWM}$ PWM control signal;
$S_{PWM1}$, $S_{PWM2}$ Adapted PWM control signal;
t Time;
TA Outside temperature (temperature);
te1, te2 Pulse width;
T Period duration of the PWM signal;
$U_B$, $U_{B1}$, $U_{B2}$, Input voltage (operating voltage);
u(t) Time-varying voltage signal;

The invention claimed is:

1. Method for controlling a DC pump motor by a pulse-width modulated (PWM) control signal, wherein current parameters are acquired in an acquisition step, and a duty cycle (D) of the PWM control signal ($S_{PWM}$) is adapted and/or changed with the aid of the acquired parameters in an adaptation step, the acquisition of current parameters comprising at least the acquisition of a current input voltage ($U_B$), wherein the acquisition of current parameters further comprises the acquisition of a motor current ($I_m$) of the DC pump motor and/or of an outside temperature ($T_A$), wherein the parameter acquisition units have at least one input voltage sensor for acquiring an input voltage and one or more of the following sensors:
    a motor current sensor for detecting a motor current of the DC pump motor; and
    an outside temperature sensor for acquiring an outside temperature,
wherein the current parameters comprises an input voltage ($U_B$) and the motor current ($I_m$) of the DC pump motor, and an external temperature ($T_A$).

2. Method according to claim 1, wherein in the adaptation step the duty cycle (D) of the PWM control signal is adapted independently of the input voltage ($U_B$) if the input voltage ($U_B$) acquired in the acquisition step falls below a lower threshold value ($U_{Schw}$).

3. Method according to claim 1, wherein in the adaptation step the duty cycle (D) of the PWM control signal is adapted in such a way that a substantially identical rotational speed (UN) of the direct-current pump motor, which speed is predetermined as constant, is achieved.

4. Method according to claim 3, wherein the adaptation of the duty cycle (D) of the PWM control signal is carried out in order to achieve an at least substantially constant rotational speed without recourse to the measured values of a rotational speed sensor.

5. Method according to claim 1, wherein the acquisition step can take place in an event-controlled manner at irregular intervals and/or at cyclic intervals.

6. Method according to claim 1, wherein in the adaptation step the duty cycle (D) is set to a value from zero to one in accordance with a predetermined formula as a function of the detected input voltage ($U_B$) and the optionally acquired outside temperature ($T_A$), as well as the optionally acquired motor current ($I_m$) of the DC pump motor, wherein the values zero and one are included in particular.

7. Method according to claim 1, wherein, in the acquisition step, a rotational speed (n) of the DC pump motor is detected by a rotational speed sensor, and wherein in the adaptation step the duty cycle (D) of the PWM control signal ($S_{PWM}$) is adapted such that an at least substantially constant rotational speed of the DC pump motor is achieved.

8. Method according to claim 7, wherein, when the method is applied in a pump element for pumping lubricant from a lubricant reservoir, a pumping quantity of the pump element is determined from a pump stroke and the substantially constant rotational speed of the DC pump motor.

9. Method according to claim 8, wherein a filling level of the lubricant reservoir is determined on the basis of the pumping quantity of the pump element.

10. Control unit for controlling a DC pump motor, wherein the control unit is controlled according to the method according to claim 1 and has the following:
a DC pump motor which is designed in particular as a brushed DC motor;
one or more switching element(s); and
a control module adapted to switch the switching element(s) into a conductive or a non-conductive state;
wherein the drive unit further comprises parameter acquisition units adapted to acquire current parameters and wherein the switching element(s) are switched by the control module such that the DC pump motor is controlled by a pulse-width modulated (PWM) control signal ($S_{PWM}$),
wherein a duty cycle (D) of the PWM control signal ($S_{PWM}$) is adapted and/or changed on the basis of the detected current parameters, wherein the parameter acquisition units have at least one input voltage sensor for acquiring an input voltage and preferably one or more of the following sensors:
a motor current sensor for detecting a motor current of the DC pump motor; and preferably
an outside temperature sensor for acquiring an outside temperature,
wherein the current parameters comprises an input voltage ($U_B$) and the motor current ($I_m$) of the DC pump motor, and preferably an external temperature ($T_A$).

11. Control unit (1) according to claim 10,
wherein the PWM control signal ($S_{PWM}$) is adapted as a function of one or more parameters acquired by the parameter acquisition units, preferably without recourse to measured values of a rotational speed sensor, in such a way that an at least substantially constant rotational speed of the DC pump motor is achieved.

12. Control unit according to claim 10, which further has no rotational speed sensor or does not interact with any rotational speed sensor.

13. Control unit according to claim 10, which further comprises a rotational speed sensor which detects the rotational speed of the DC pump motor, wherein the PWM control signal ($S_{PWM}$) is adapted such that an at least substantially constant rotational speed of the DC pump motor is achieved.

14. Control unit according to claim 10, wherein the control unit, if the control unit is integrated in a pump element for pumping lubricant from a lubricant reservoir, is adapted to determine a pumping quantity of the pump element on the basis of a pump stroke and the substantially constant rotational speed of the DC pump motor.

15. Pump system comprising the following:
a pump element operated with a DC pump motor;
the DC pump motor, which is preferably designed as a brushed DC motor;
a lubricant reservoir to which the pump element is connected;
a control unit according to claim 10 for controlling the DC pump motor; and
a display for displaying a filling level of the lubricant reservoir determined by the control unit.

16. Method for calibrating a control unit according to claim 10, wherein initial parameters, such as a stored formula for determining the duty cycle (D) of the PWM control signal ($S_{PWM}$), and preferably a pump stroke value, are provided by the manufacturer, and wherein the initial parameters are calibrated by means of test measurements in a plurality of calibration steps under specific conditions.

17. Method according to claim 16, comprising the following calibration steps:
applying certain calibration voltages to the control unit;
controlling the DC pump motor with the control unit;
performing test measurements by determining an actual rotational speed under a predetermined load;
comparing the actual rotational speed with a target rotational speed to be reached under the predetermined load; and
adjusting the initial parameters so that the actual rotational speed and the target rotational speed match.

18. Method for controlling a DC pump motor according to claim 1, wherein the DC pump motor is a brushed DC motor for pumping lubricant.

19. Control unit (-) according to claim 10, wherein a filling level of the lubricant reservoir is determined on the basis of the pumping quantity of the pump element.

* * * * *